US010219314B2

(12) United States Patent
Taniguchi et al.

(10) Patent No.: US 10,219,314 B2
(45) Date of Patent: Feb. 26, 2019

(54) COMMUNICATION DEVICE, COMMUNICATION SYSTEM AND MEDIUM

(71) Applicant: CANON KABUSHIKI KAISHA, Tokyo (JP)

(72) Inventors: Kazuya Taniguchi, Kawasaki (JP); Kensuke Yasuma, Tokyo (JP); Yukio Numakami, Kawasaki (JP); Makoto Kunimatsu, Tokyo (JP); Tomoya Sakai, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 173 days.

(21) Appl. No.: 15/154,342

(22) Filed: May 13, 2016

(65) Prior Publication Data

US 2016/0353513 A1 Dec. 1, 2016

(30) Foreign Application Priority Data

May 25, 2015 (JP) ................................. 2015-105820

(51) Int. Cl.
*H04W 76/25* (2018.01)
*H04W 40/24* (2009.01)
*H04L 29/08* (2006.01)

(52) U.S. Cl.
CPC ............. *H04W 76/25* (2018.02); *H04L 67/02* (2013.01); *H04L 67/145* (2013.01); *H04W 40/24* (2013.01)

(58) Field of Classification Search
CPC ...... H04L 67/02; H04L 67/145; H04W 40/24; H04W 76/045
See application file for complete search history.

(56) References Cited

U.S. PATENT DOCUMENTS

| 6,917,587 | B1 * | 7/2005 | Sarkar | ................. | H04M 3/2254 |
| | | | | | 370/230 |
| 2003/0225889 | A1 * | 12/2003 | Moutafov | ............... | G06F 9/547 |
| | | | | | 709/227 |
| 2006/0212589 | A1 * | 9/2006 | Hayer | .................. | H04L 63/102 |
| | | | | | 709/229 |
| 2015/0032804 | A1 * | 1/2015 | Fablet | ..................... | H04L 67/26 |
| | | | | | 709/203 |
| 2015/0229627 | A1 | 8/2015 | Yasuma | | |

FOREIGN PATENT DOCUMENTS

JP 2014-199998 A 10/2014

* cited by examiner

*Primary Examiner* — Rina C Pancholi
(74) *Attorney, Agent, or Firm* — Carter, DeLuca, Farrell & Schmidt, LLP

(57) ABSTRACT

When, in communication using a protocol in which at least two streams are established over a connection, a notification that a new stream will be reserved is made, a process for preventing a non-communication state exceeding a predetermined amount of time is initiated and a frame is sent at least every predetermined amount of time in the case where there is no other stream currently reserved, whereas processing is ended without initiating the stated process in the case where there is already a reserved stream.

15 Claims, 8 Drawing Sheets

COMMUNICATION DEVICE, COMMUNICATION SYSTEM AND MEDIUM

BACKGROUND OF THE INVENTION

Field of the Invention

The present invention relates to communication devices, communication systems and a computer readable medium.

Description of the Related Art

HTTP (Hyper Text Transfer Protocol) is one example of a protocol (communication protocol) in wide use as an Internet standard technique. The Internet Engineering Task Force (IETF) has recently developed a new version of HTTP (HTTP/2). HTTP/2 adds new functions while maintaining compatibility with the existing technology of HTTP 1.1. For example, HTTP/2 is capable of establishing multiple streams, which are bi-directional flows of frames across a virtual channel, within a single connection. An HTTP request/response is allocated to a single stream, and one stream is independent from other streams, which means that request blocks, terminations, and so on do not interfere with the progress of other requests.

To handle a connection termination caused by networks firewalls, PPPoE or NAT timeouts, or the like, or in other words, caused by a non-communication state continuing for more than a set amount of time, a technique has been proposed in which a packet is sent to a server device to maintain a connection when a non-communication state in the connection has reached a predetermined amount of time, and the predetermined amount of time is shortened when it is detected that packets are not being communicated (Japanese Patent Laid-Open No. 2014-199998).

The technique disclosed in Japanese Patent Laid-Open No. 2014-199998 does not take into consideration control for maintaining a connection in communication where at least two streams are established on the connection. As such, in the case where streams are independent from each other in a single connection as described above and a single stream is being communicated on a given connection, there have been cases of unnecessary communication arising to maintain the connection in other streams.

SUMMARY OF THE INVENTION

The present invention provides a communication device, a communication system and a computer readable medium storing a program that maintain a connection while suppressing unnecessary communication.

The present invention has the following configuration.

According to a first aspect of the present invention, there is provided a communication device comprising:

a communication unit that communicates with another communication device through one or more streams established with the other communication device on the basis of a connection established with the other communication device;

a determination unit that determines whether a no-communication time period, which is a time period in which no communication based on the one or more streams established based on the connection is carried out with the other communication device after a notification for reserving a new stream based on the connection established with the other communication device has been received from the other communication device, has reached a predetermined amount of time; and a connection maintenance unit that, in a case where the determination unit has determined that the no-communication time period, in which no communication based on the one or more streams established based on the connection with the other communication device is carried out after the notification for reserving a new stream based on the connection has been received from the other communication device, has reached the predetermined amount of time, executes a process for sending a message for maintaining the connection to the other communication device.

According to a second aspect of the present invention, there is provided a communication device that communicates over a connection established with another communication device, the communication device comprising:

a determination unit that determines whether a no-communication time period, which is a time period in which no communication using the connection is carried out with the other communication device after a notification for reserving the sending of data using the connection established with the other communication device has been received from the other communication device, has reached a predetermined amount of time; and a connection maintenance unit that, in a case where the determination unit has determined that the no-communication time period, in which no communication using the connection with the other communication device is carried out after the notification for reserving the sending of data using the connection has been received from the other communication device, has reached the predetermined amount of time, executes a process for sending a message for maintaining the connection to the other communication device.

According to a third aspect of the present invention, there is provide a communication system comprising a communication device and another communication device, wherein the communication device includes:

a communication unit that communicates with another communication device through one or more streams established with the other communication device on the basis of a connection established with the other communication device;

a determination unit that determines whether a no-communication time period, which is a time period in which no communication based on the one or more streams established based on the connection is carried out with the other communication device after a notification for reserving a new stream based on the connection established with the other communication device has been received from the other communication device, has reached a predetermined amount of time; and a connection maintenance unit that, in a case where the determination unit has determined that the no-communication time period, in which no communication based on the one or more streams established based on the connection with the other communication device is carried out after the notification for reserving a new stream based on the connection has been received from the other communication device, has reached the predetermined amount of time, executes a process for sending a message for maintaining the connection to the other communication device.

According to the present invention, a connection can be maintained while suppressing unnecessary communication.

Further features of the present invention will become apparent from the following description of exemplary embodiments with reference to the attached drawings.

DESCRIPTION OF THE EMBODIMENTS

First Embodiment

Figure 1:
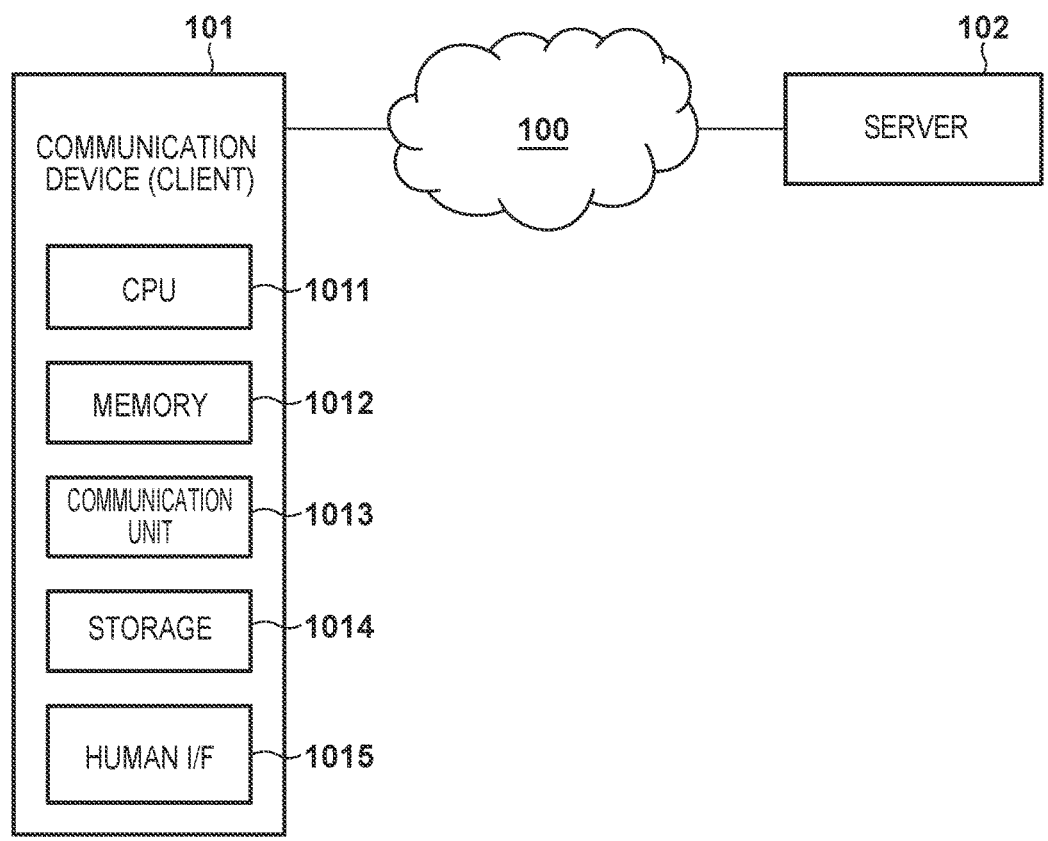
FIG. 1 is a diagram illustrating a system configuration of a communication device 101 according to a first embodiment.

Hereinafter, embodiments of the present invention will be described with reference to the drawings. FIG. 1 is a diagram illustrating the system configuration of a communication system according to a first embodiment. A communication device 101 and a server 102 are connected over a network 100. The network 100 according to the present embodiment can be realized as a combination of the Internet, a WAN (Wide Area Network), a LAN (Local Area Network), or the like. The communication device 101 and the server 102 may be connected using a wireless ad-hoc network, for example.

The communication device 101 is a communication device that connects to the network 100. The server 102 is a server that connects to the network 100 and is communicated with by the communication device 101. While the server 102 is realized by a single PC in the present embodiment, the server 102 may include a proxy server, and may be spread out throughout the cloud. The communication device 101 communicates with the server 102 over the network 100 using HTTP/2. In other words, the communication device 101 and the server 102 have TCP/IP protocol stacks. The communication device 101 is an HTTP/2-compliant client, and the server 102 is an HTTP/2-compliant server.

Figure 3:
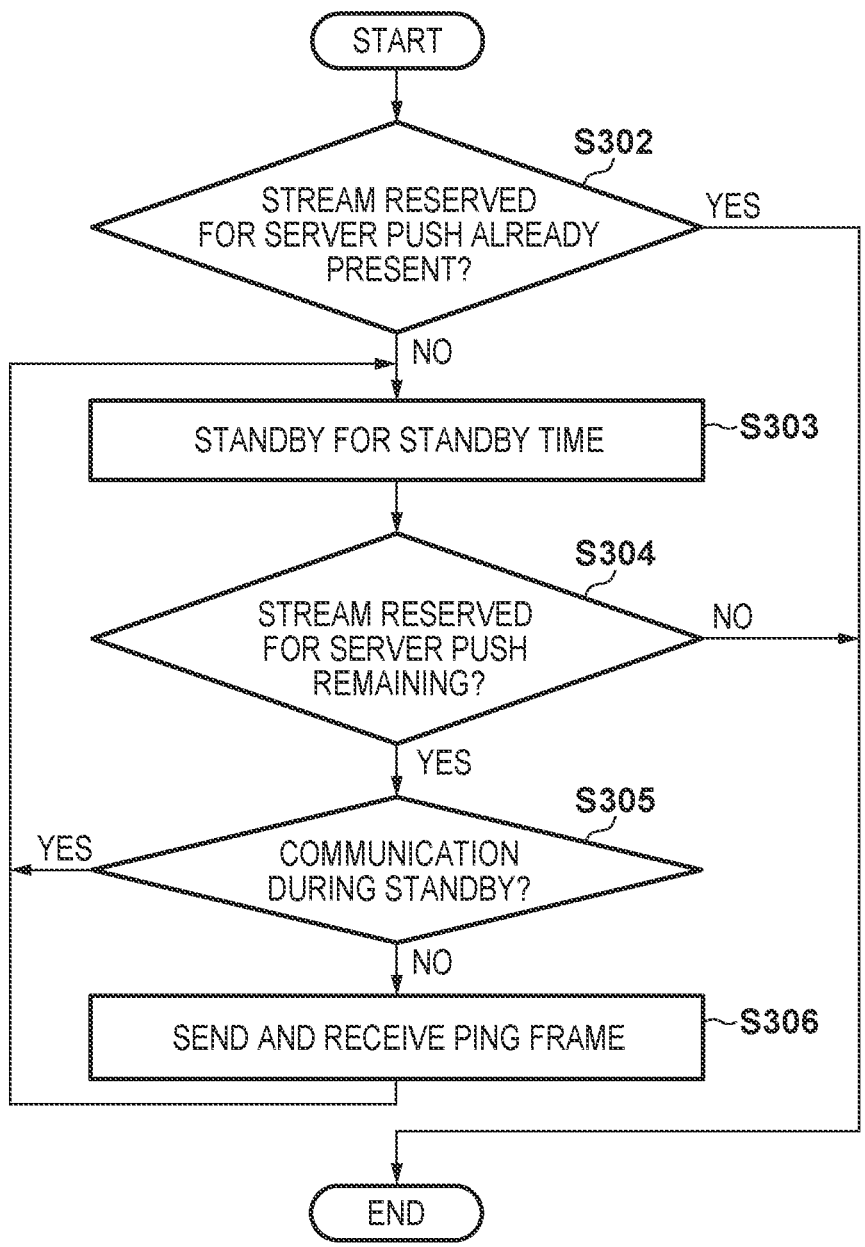
FIG. 3 is a flowchart illustrating processing executed when the communication device 101 carries out a process for maintaining a stream for a server push with a server 102 using HTTP/2.
Figure 6:
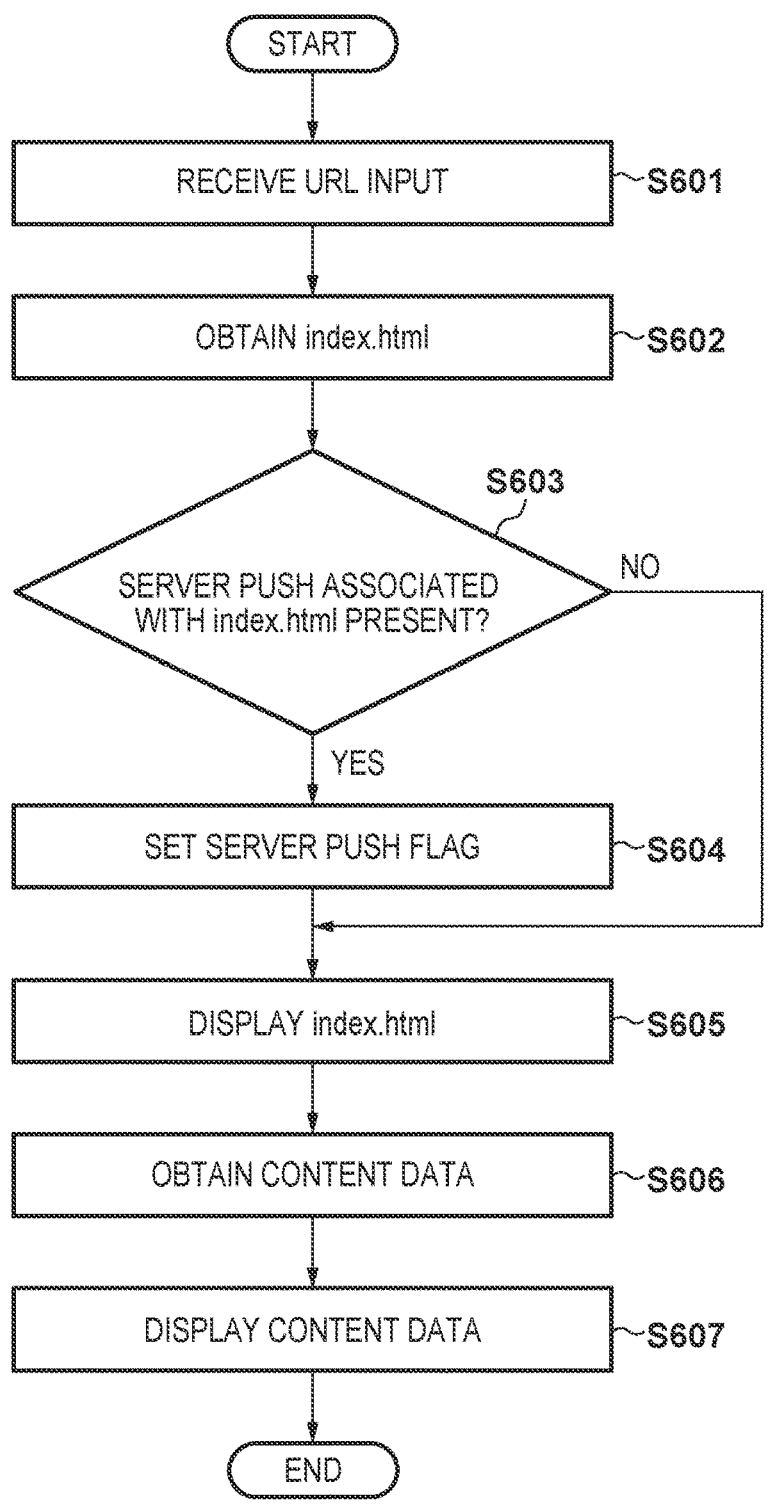
FIG. 6 is a flowchart illustrating, in communication using HTTP/2, processing through which the communication device 101 displays a web page in a web browser.
Figure 7:
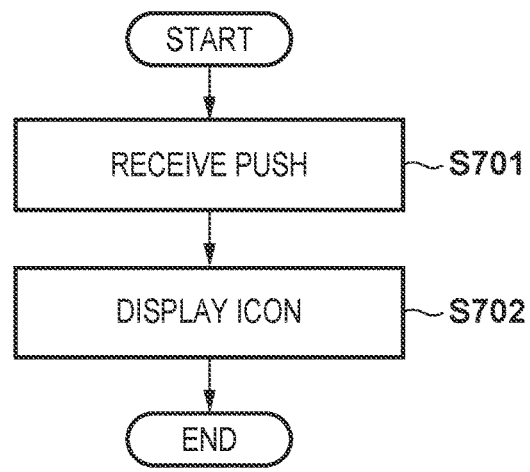
FIG. 7 is a flowchart illustrating, in communication using HTTP/2, processing through which the communication device 101 receives a server push from the server 102 during or after the display of the web page as indicated in the flowchart of FIG. 6 and displays an icon.

These communication devices can each be realized as a computer that has a communication unit 1013 providing a communication function and that is capable of connecting to the network 100, as in the case with the communication device 101 illustrated in FIG. 1. It is sufficient for the computer to have a generic computer configuration, including, for example, a processor (CPU) 1011, a memory 1012, a file storage 1014, a human interface device 1015 including an input unit and an output unit (a display unit), and the like in addition to the communication unit 1013. With respect to the functions concerning communication, the physical layer, data link layer, and the like, for example, are partially realized by hardware, whereas some of the remaining layers and layers thereabove, such as the TCP/IP protocol stack, are normally realized by executing programs therefor using the processor, for example. These programs also include an HTTP/2-compliant web browser (or server), which will be mentioned later, and some of the processing sequences related thereto are illustrated in FIGS. 3, 6, and 7.

Module Configuration of Communication Device 101

Figure 2:
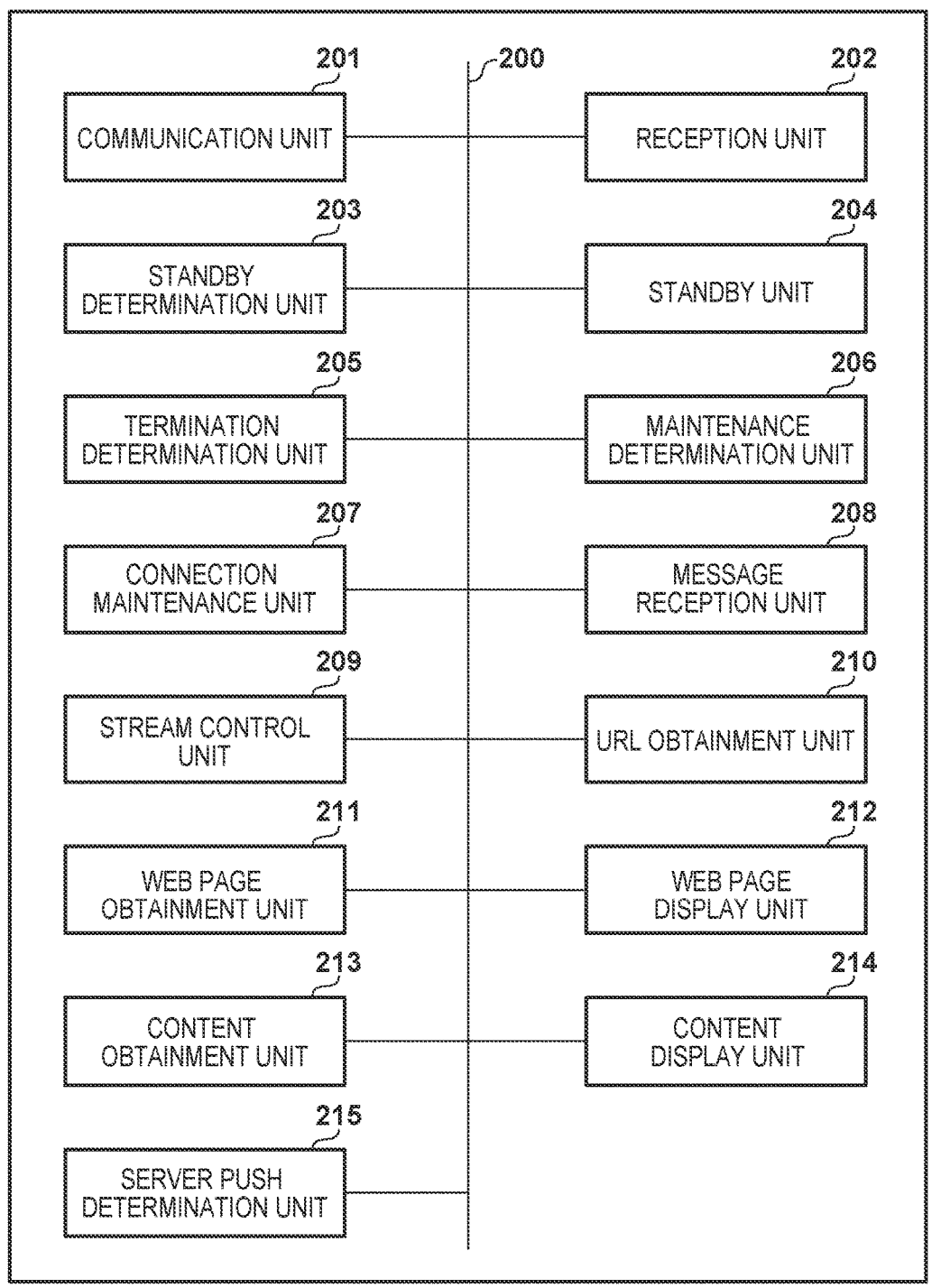
FIG. 2 is a diagram illustrating a module configuration of the communication device 101.

FIG. 2 is a diagram illustrating the module configuration of the communication device 101. Reference numeral 200 indicates a bus to which the modules are connected. Reference numeral 201 indicates a communication unit that carries out TCP/IP processing and TLS (Transport Layer Security) processing.

Reference numeral 202 indicates a reception unit that receives HTTP/2 communication from the server 102. Reference numeral 203 indicates a standby determination unit that determines whether or not to stand by, through a standby unit 204, to reduce unnecessary message processing. Reference numeral 204 indicates the standby unit, which stands by in order to control a time period serving as a reference for a determination made by a maintenance determination unit 206. Reference numeral 205 indicates a termination determination unit that determines whether to terminate processing carried out by the maintenance determination unit 206 and a connection maintenance unit 207. Reference numeral 206 indicates the maintenance determination unit, which determines whether or not to maintain a connection through the connection maintenance unit 207. Reference numeral 207 indicates the connection maintenance unit, which communicates with the server 102 in order to maintain a connection.

Here, "connection" refers to a transport layer connection between two end points (the communication device 101 and the server 102, in this example), and in HTTP/2, a single connection can include multiple streams. The connection is defined by what is known as a 5-tuple, which includes a source IP address, a source port number, a target IP address, a target port number, and a protocol ID, for example. "Stream" refers to a bidirectional flow of frames through a virtual channel within a single connection, and constitutes a logical (or virtual) communication path; unique IDs are assigned at least to streams within the same connection. An HTTP request/response pair is allocated to a single stream, and one stream is independent from other streams. This means that request blocks, terminations, and so on in a given stream do not interfere with the progress of requests in other streams.

Reference numeral 208 indicates a message reception unit that receives a message pushed from the server 102. "Server push" is one of the functions provided by HTTP/2, in which a response related to a request initiated in advance by a client is sent (or "pushed") by the server to the client even when there has been no request for that response. Server push can also be referred to as asynchronous sending of data or frames by the server.

Reference numeral 209 indicates a stream control unit that sends frames to the server 102 on a stream-by-stream basis. Although the stream control unit 209 processes four streams in this example, the number of processed streams is not limited to four, and may be any number up to the maximum number of streams defined by the protocol. Reference numeral 210 indicates a URL obtainment unit that obtains a URL input by a user. Reference numeral 211 indicates a web page obtainment unit that obtains a web page from the server 102. Reference numeral 212 indicates a web page display unit that displays a web page in the web browser. Reference numeral 213 indicates a content obtainment unit that obtains content data associated with a web page. Reference numeral 214 indicates a content display unit that displays content data in the web browser. Reference numeral 215 indicates a server push determination unit that determines, on the basis of web page information, whether to carry out a server push.

In FIG. 2, for example, the communication unit 201 belongs partially or wholly to a layer lower than HTTP/2, whereas the reception unit 202 to the server push determination unit 215 belong to HTTP/2. The HTTP/2 functions can be realized, for example, by the processor executing a web browser program.

Browser Window Examples

Figure 5A:
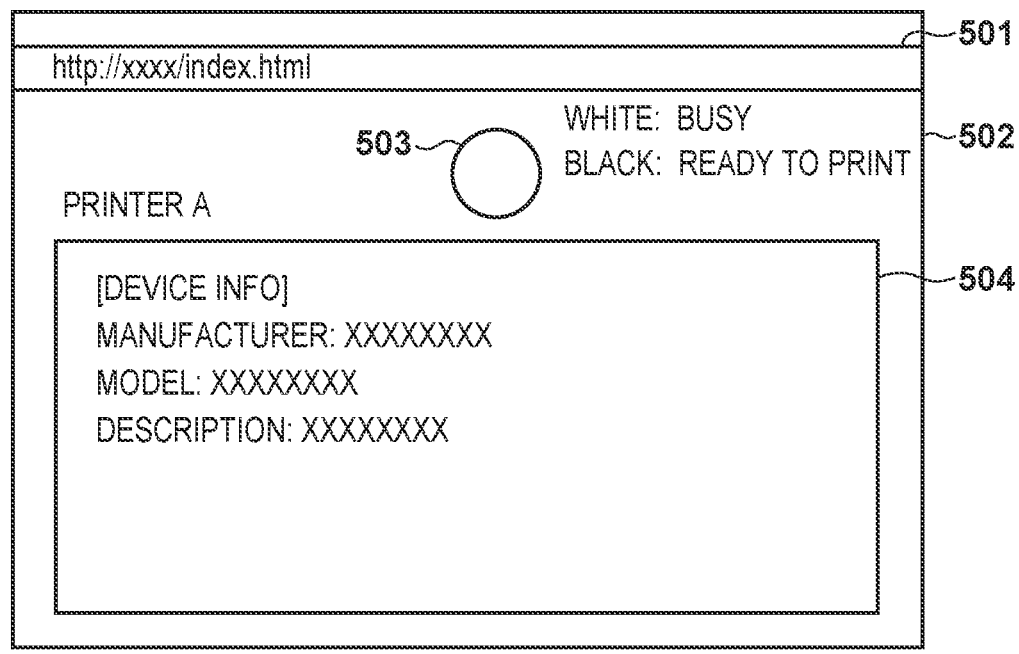
FIG. 5A is a diagram illustrating a web browser window according to the first embodiment.
Figure 5B:
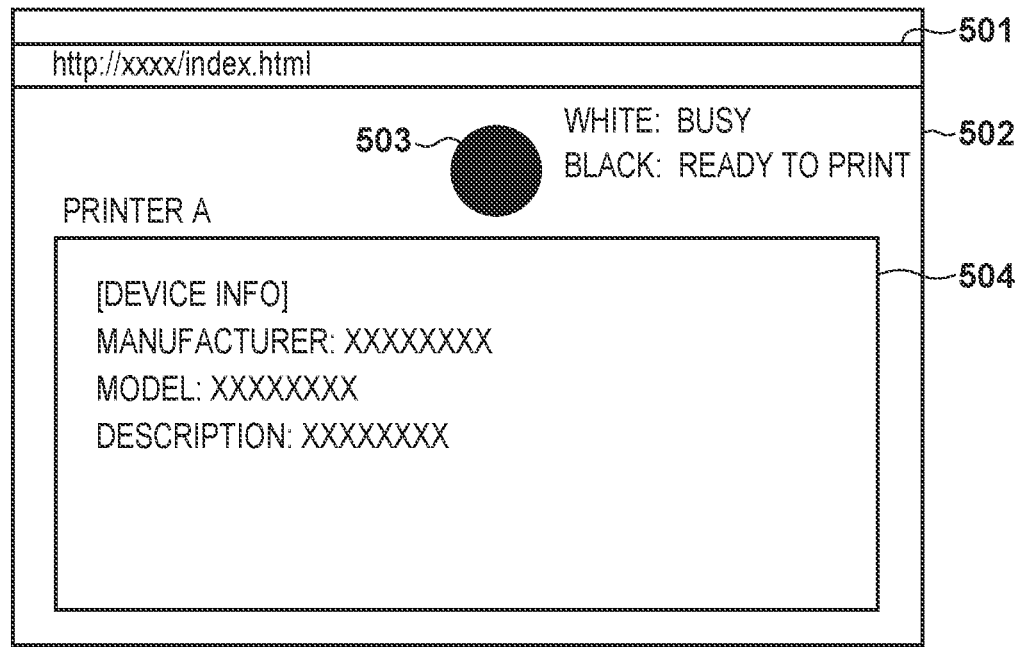
FIG. 5B is a diagram illustrating a web browser window according to the first embodiment.

FIGS. 5A and 5B are diagrams illustrating web browser windows according to the first embodiment. A URL display field 501 is a field for displaying the URL of a web browser page. A web page window 502 is a window screen that displays the web page in the present embodiment. The web page window 502 is constructed and displayed by the web page display unit 212 on the basis of web data written in an HTML format. A status icon 503 is an icon displayed within the web page window 502. Here, the status icon 503 indicates the status of a printer. The status icon 503 may be content data such as images or text, a style sheet, or the like instead of an icon as well. The status icon 503 can also be implemented as an LED, audio, or the like, for example. A content window 504 is content data associated with the web page window 502.

In the examples illustrated in FIGS. 5A and 5B, the server 102 is a server incorporated into a printer device such as a multifunction peripheral, for example, and the communication device 101 is a computer. The communication device 101 specifies a URL to the server 102 and makes a request for information, such as device information of the printer device provided in the server 102, as content. The web page display unit 212 of the communication device 101 constructs the web page by rendering the device information received as a response from the server 102 in the content window 504 and rendering the status information as the status icon 503, and displays the web page in the web page window 502. In this manner, the communication device 101, which is an HTTP client, and in particular the web browser run by the communication device 101, can obtain data from the server 102 through HTTP/2 and construct and display a web page.

Web Page Display

FIG. 6 is a flowchart illustrating, in communication using HTTP/2, processing through which the communication device 101 displays a web page in the web browser.

The URL obtainment unit 210 obtains, from the URL display field 501, a URL input by a user (S601). The web page obtainment unit 211 sends, to the server 102, an HTTP request specifying the URL obtained in S601, and obtains an HTML file index.html indicating an index page (this is also called an "index file") from the server 102 as a response to the request (S602). At this time, a connection is established between the client and the server, and streams are furthermore established in that connection, with the HTTP request and response being exchanged through one of the streams. Note, however, that the connection need not be newly established, and a connection established for a request-response that has already been completed may be reused as well.

The server push determination unit 215 determines, on the basis of the data obtained in S602 (the index file index.html, for example), whether or not there is a server push associated with the index file index.html (or whether or not such a server push has been promised) (S603). In this example, the server 102 records the server push in the index file index.html and notifies the communication device 101, which is the client, in this manner. In S603, the determination is carried out on the basis of this notification. This, however, is merely one example, and as long as a method through which the server 102 notifies the communication device 101 is set, any method may be used. For example, whether or not there is a server push can also be determined on the basis of whether the reception unit 202 has received a PUSH_PROMISE frame. In this case, it is determined that there is a server push when a PUSH_PROMISE frame has been received. Or, a unique tag for server pushes may be defined and it may then be determined if the tag is present.

The process moves to S604 in the case where it is determined in step S603 that there is a server push. The process moves to S605 in the case where there is no server push. In the case where it has been determined that there is a server push, the server push determination unit 215 sets a server push flag for carrying out processing for maintaining a connection, illustrated in FIG. 3 (S604). Although a server push flag is set here, a method in which the connection maintenance flow, described later with reference to FIG. 3, is carried out without setting the flag may be employed as well. Because the reservation of a stream used in the server push is communicated using a PUSH_PROMISE frame, the server push flag may be set in association with the corresponding stream.

The web page display unit 212 displays the received index file index.html in the web page window 502 (S605). The content obtainment unit 213 obtains the content data associated with the index file index.html (S606). Although the filename of the index is index.html in the present embodiment, another html filename may be used, or a file in another format may be used. The content display unit 214 displays the content data obtained by the content obtainment unit 213 in the content window 504 (S605). Although the content obtainment unit 213 and the content display unit 214 only handle a single piece of content data in the present embodiment, two, three, or more pieces may be handled as well. The content data may be in image, text, or style sheet format as well. Although the present embodiment gives a flowchart in which the content data is displayed in the web browser, the content data may be displayed in the screen of a camera, a printer, or the like as well.

FIG. 7 is a flowchart illustrating, in communication using HTTP/2, processing through which the communication device 101 receives a server push from the server 102 during or after the display of the web page as indicated in the flowchart of FIG. 6 and displays an icon. The message reception unit 208 receives a server push from the server 102 (S701). The content display unit 214 displays the content data received from the message reception unit 208 as the status icon 503 (S702). The sequence in FIG. 7 is executed each time a server push is received. When there is a change in status while the window is displayed, the server 102 pushes the new status, and the communication device 101 updates the status icon in accordance with the received status information. As such, the status icon can reflect changes in the status almost in real time.

Connection Maintenance Process

FIG. 3 is a flowchart illustrating, in communication using HTTP/2, processing executed when the communication device 101 makes a communication determination and carries out a connection maintenance process for maintaining a connection with the server 102. The server push flag set in S604 is monitored, and this flow is initiated when that flag has been set. Although not illustrated here, the server push flag is reset when this processing is started. However, instead of this timing, the processing may be started upon the communication device 101 receiving a server push reservation request through a PUSH_PROMISE frame. The PUSH_PROMISE frame also serves as a frame for communicating a stream reservation used for a server push to the communication device 101.

The standby determination unit 203 determines whether or not to stand by using the standby unit 204 (S302). The standby determination unit 203 ends the process in the case where there is already a stream that has been reserved for a server push. The process moves to S303 in the case where there is no stream that has already been reserved for a server push. The standby determination unit 203 can make the determination in step S302 on the basis of whether or not there is a reserved stream in a table in which a list of streams reserved for server pushes is registered (also called a "reserved stream table"), for example. A reserved stream table is held for each connection. It is sufficient for a connection maintenance process using a PING frame to be carried out for a single stream in a single connection. If there is already a stream reserved for a server push, the connection will be maintained for that stream, and it is therefore not necessary to maintain the connection for other streams within the same connection. As such, unnecessary connection maintenance processing can be eliminated by determining whether or not there is a stream already reserved for a server push in step S302 and skipping procedures for maintaining the connection in the case where such a stream is present. In this manner, it can be determined in step S302 whether or not a process for maintaining a connection is already being executed on the basis of whether or not there is a reserved stream.

Regardless of whether the determination result is yes or no, a stream reserved for the server push determined in step S603 is registered in the reserved stream table as a new reserved stream immediately after step S302. The registered information may be a stream ID. The reserved stream table indicates streams reserved for server pushes in the associated connection. Each time a reserved stream is closed, that stream is deleted from the reserved stream table.

In step S302, the standby determination unit 203 may determine whether or not there is a stream registered in the reserved stream table as described above, or may determine whether or not there is a stream whose state is reserved (remote) or half closed (local). In the case where such a stream is present, it is determined in step S302 that there is a stream already reserved for a server push. According to HTTP/2, a stream having a PUSH_PROMISE frame is set to a "half closed (remote)" state in the server and a "half closed (local)" state in the client. Meanwhile, when a stream to be used thereafter is reserved by a PUSH_PROMISE frame being received in a different stream, the state of the reserved stream transitions to "reserved (remote)". Accordingly, streams having such states can be determined in step S302 to be streams reserved for a server push even if those streams are not streams belonging to the server push newly communicated in S603. The stream ID of the newly-reserved stream can be communicated by the PUSH_PROMISE frame and whether or not the stream is the same can be determined based on the stream ID, for example.

Meanwhile, entries can be registered in or deleted from the reserved stream table for each reserved stream, but as long as the information is managed on a connection-by-connection basis, it is sufficient for the reserved stream table to be information indicating that at least one reserved stream is contained in a connection to be monitored. Because this information is set on a connection-by-connection basis, the information may be set each time a stream is newly reserved for a server push; however, if a reserved stream has been closed, it is necessary to determine whether there are any other reserved streams in the connection and execute a reset only in the case where there are no other such streams.

In the case where it has been determined in step S302 that there are no streams already reserved for a server push, the connection maintenance process is initiated from step S303 on. The standby unit 204 stands by for a predetermined standby time (S303). Here, the "standby time" may be a standby time held by the communication device 101 or may be a standby time held by the server 102. For example, an amount of time a connection can be maintained between the communication device 101 and the server 102 may be measured and a lower value than the measured value may be used. Alternatively, the standby time may be a random time calculated using part of the stated times.

To determine whether to end the processing performed by the maintenance determination unit 206 and the connection maintenance unit 207, the termination determination unit 205 refers to the reserved stream table or stream states, for example, and determines whether or not a stream reserved for a server push remains in the associated connection (S304). The process moves to S305 in the case where a stream that has been reserved for a server push remains. In the case where there are no remaining streams reserved for a server push, it is no longer necessary to maintain the connection for server pushes, and thus the processing is ended. Note that when a reserved stream within a given connection is closed, that stream is deleted from the reserved stream table.

The maintenance determination unit 206 determines whether or not to maintain the connection through the connection maintenance unit 207 (S305). In the case where there has been communication on the connection to be maintained while the standby unit 204 is standing by, it is determined that the connection need not be maintained, and the process moves to S303; however, in the case where there has been no communication on the connection while standing by, it is determined to be necessary to maintain the connection, and the process moves to S306. In the determination of step S305, the times at which frames are sent and received over the connection to be maintained may be recorded, for example, and it may then be determined whether those times indicate the sending/receiving occurred during standby. Meanwhile, in the case where the process moves from step S305 to step S303, in step S303, the amount of time from the last communication to the present time is subtracted from the predetermined standby time and the standby unit 204 stands by until that time is reached. Doing so makes it possible to stand by for a predetermined amount of time using the time of the last communication as a starting point.

In step S306, the connection maintenance unit 207 sends and receives a PING frame, and the process moves to S303. Here, the PING frame may be a frame type used in communication in a stream, such as a HEADERS frame. The PING frame may also be a DATA frame using a server push stream.

Through the sequence described above, the amount of time a non-communication state continues is at maximum the standby time employed in step S303 (strictly speaking, this also includes processing delays), which prevents connections expected to be used for server pushes from being closed due to times of no communication.

Rather than standing by in step S303, the time of a non-communication state can be monitored by resetting a timer to a predetermined time each time a frame is sent or received in the connection being monitored. By employing such a configuration, the timer runs out only in the case where there is no communication for the predetermined amount of time, and thus when a determination of "yes" has been made in step S304, the PING frame may be sent/received in step S306 without carrying out S305.

Connection Maintenance Sequence

Figure 4:
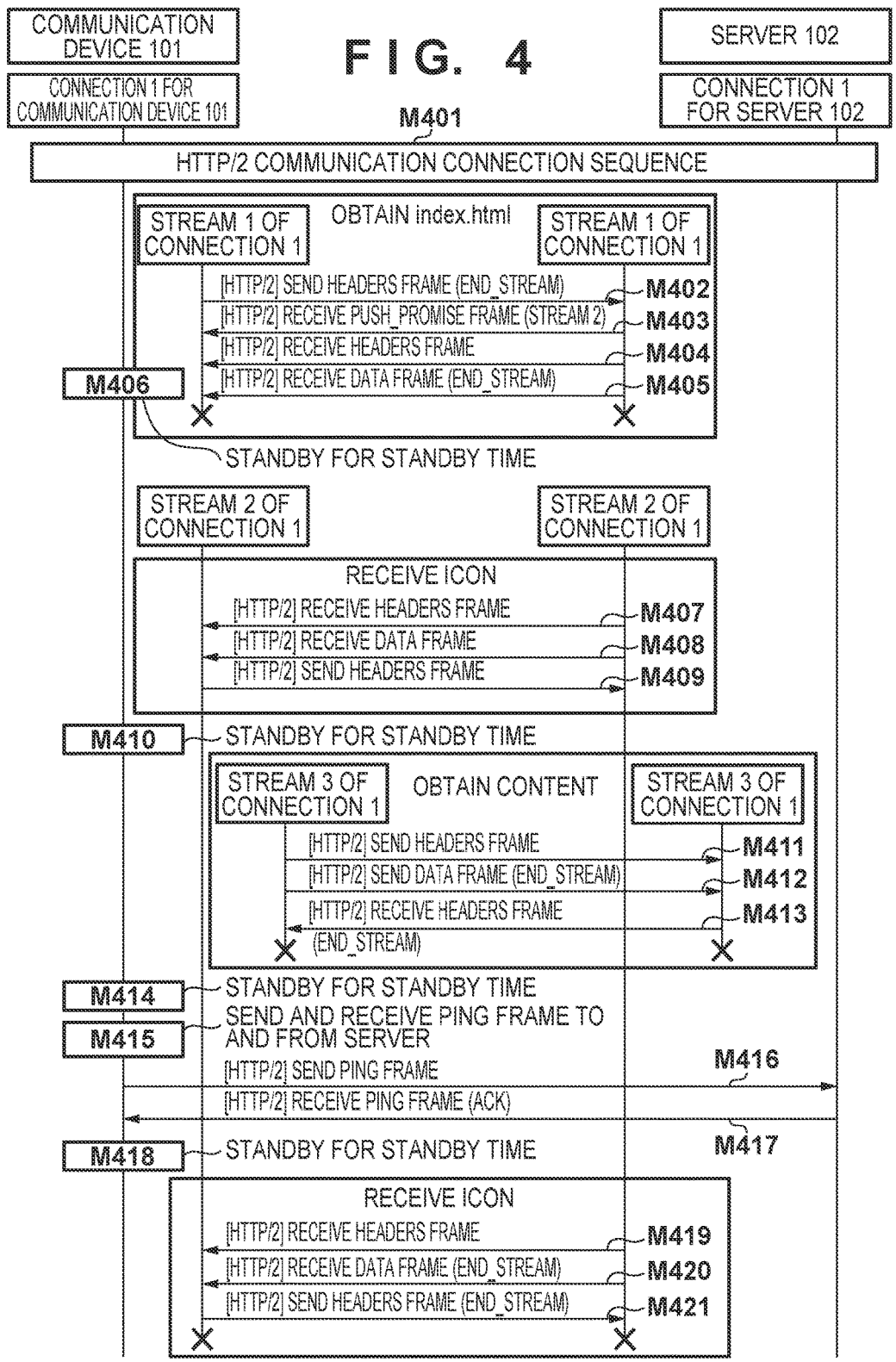
FIG. 4 is a sequence chart illustrating processing carried out when, in communication using HTTP/2, the communication device 101 makes a communication determination and maintains a connection with the server 102.

FIG. 4 is a sequence chart illustrating, in communication using HTTP/2, processing carried out so that the communication device 101 maintains a connection with the server 102.

In M401, the communication unit 201 initiates HTTP/2 communication with the server 102 and opens a connection 1.

In M402, the stream control unit 209 sends a HEADERS frame specifying an END_STREAM flag in its payload to the server 102 through a stream 1 included in the connection 1. The HEADERS frame is used to open a stream. Note that the communication up to M405 is carried out through the stream 1. In M403, the reception unit 202 receives a PUSH PROMISE frame from the server 102. The PUSH_PROMISE frame is a frame used by a sender (the server 102) to preemptively notify a peer end point (the communication device 101, in this case) of the stream that will be opened, and includes an identifier of the stream to be reserved. Note that M403 may be carried out after M404. In M404, the reception unit 202 receives, from the server 102, a HEADERS frame response to the HEADERS frame sent in M402. In M405, the stream control unit 209 receives, from the server 102, a DATA frame specifying an END_STREAM flag in its payload.

The DATA frame is a frame that conveys the payload of an HTTP request or response. END_STREAM, meanwhile, is a flag indicating the final frame sent in a specific stream. The stream is closed when a frame in which the END_STREAM flag is set is sent to the server 102 or received by the communication device 101. The stream transitions to a "half closed" or "closed" state in response to this flag being set.

Although M404 to M405 indicate a sequence for receiving a HEADERS frame and receiving a DATA frame (END_STREAM), the sequence may instead be for receiving a HEADERS frame, receiving a DATA frame, and receiving a DATA frame (END_STREAM), for receiving a HEADERS frame (END_STREAM), or the like.

In M406, in the case where the standby determination unit 203 determines that there are no other streams reserved for a server push at this point in time (No in S302), the standby unit 204 stands by for the standby time (S303). Thereafter, a stream 2 is registered in the table as a server push reserved stream, for example. The stream 2 is reserved for a server push, and thus the status thereof as viewed from the communication device 101 is "reserved (remote)", for example.

In M407 and M408, the communication device 101 receives a push response from the server 102 through the reserved stream 2. In M407, the message reception unit 208 receives a HEADERS frame from the server 102. A push response is initiated by the server 102 from M407. "Push response" refers to sending a response to a reserved server push. The communication up to M409 and in M419 to M421 is a push response, and is carried out through the stream 2. In M408, the message reception unit 208 receives a DATA frame from the server 102. The payload of this data frame is, for example, status information of the printer into which the server 102 is incorporated. In M409, the stream control unit 209 sends, to the server 102, a HEADERS frame response to M407 and M408. At this point in time, the server 102 does not close the stream 2, and the stream 2 therefore remains open.

In M410, the termination determination unit 205 determines, after standing by for the predetermined amount of time in M406, that there is a stream currently reserved for a server push (the stream 2, in this example) (Yes in S304); the maintenance determination unit 206 determines that there has been communication during the standby (Yes in S305); and the standby unit 204 stands by for the standby time (S303). The determination that there was communication during the standby is made on the basis of the time at which the frame was sent in M409, for example.

In M411, the stream control unit 209 sends a HEADERS frame to the server 102. In M412, the stream control unit 209 sends, to the server 102, a DATA frame specifying an END_STREAM flag in its payload, in order to obtain content. In M413, the reception unit 202 receives, from the server 102, a HEADERS frame response specifying an END_STREAM flag in its payload, in response to M411 and M412. A stream 3 is closed here.

In M414, the termination determination unit 205 determines, after standing by in M410, that there is a stream currently reserved for a server push (Yes in S304); the maintenance determination unit 206 determines that there has been communication during the standby (Yes in S305); and the standby unit 204 stands by for the standby time (S303).

In M415, the termination determination unit 205 determines, after standing by for the predetermined amount of time in M414, that there is a stream currently reserved for a server push (the stream 2) (Yes in S304); the maintenance determination unit 206 determines that there has been no communication over the connection being monitored, which includes the stream 2, during the standby (No in S305); and the connection maintenance unit 207 sends and receives a PING frame to and from the server 102 (S306). At the point in time corresponding to M415, the response received from the server 102 in the stream 3 in M413 is the final instance of communication over the connection being monitored, occurring prior to the standby being started in M414. It is therefore determined that there was no communication over the connection being monitored, which includes the stream 2, during the standby. Here, the PING frame may be a frame type used in communication, such as a HEADERS frame. M416 and M417, which will be described later, correspond to the sequence for sending and receiving the PING frame in M415.

In M416, the stream control unit 209 sends a PING frame to the server 102. The PING frame is normally a frame used to confirm whether an idle connection is still functioning, but is used to maintain the connection in the present embodiment. In M417, the reception unit 202 receives, from the server 102, a PING frame specifying an ACK flag in its payload in response to M416. Sending and receiving this PING frame makes it possible to preemptively prevent timeouts caused by a firewall present in the connection, PPPoE or NAT timeouts, or the like, for example, and maintain the connection. Because sending the frame is sufficient for maintaining the connection, the response from the server 102 may be optional.

In M418, the standby unit 204 stands by for the standby time (S303). In M419, the message reception unit 208 receives, from the server 102, a HEADERS frame through the stream 2 reserved for the server push. In M420, the message reception unit 208 receives, from the server 102, a DATA frame specifying an END_STREAM flag in its payload. This payload is data received by the server push. In M421, the stream control unit 209 sends, to the server 102, a HEADERS frame response specifying an END_STREAM flag in its payload, in response to M419 and M420. It is determined that there is no stream currently reserved for a server push after standing by in M418 (No in S304), and the process then ends. The stream 2 is then closed and the stream 2 is deleted from the reserved stream table.

Although the present embodiment describes an example using html, the invention is not limited thereto, and can also be applied when executing commands in SOAP, REST, or the like.

As described thus far, according to the present embodiment, when the communication device 101 has received a notification of a server push from the server 102 (when a PUSH_PROMISE frame has been received, for example), it is determined whether or not there is another stream reserved for a server push. If there is no other such stream, the connection containing that stream is handled as a connection to be monitored, and a time period for which there is no communication is monitored. Once the time period for which there is no communication on that connection has reached a predetermined amount of time, some sort of frame, such as a PING frame, is sent and received.

On the other hand, in the case where there is another stream reserved for a server push when the communication device 101 has received a notification of a server push from the server 102, the monitoring of that connection was started when the other stream was reserved, and thus the processing is ended. This makes it possible to omit unnecessary connection maintenance processing when there are multiple server push reservations.

Meanwhile, in the case where a stream reserved for a server push is closed, the communication device 101 ends the processing for maintaining the connection that included that stream. This makes it possible to omit unnecessary connection maintenance after a connection reserved for a server push has been closed.

Note that from the standpoint of the communication device 101, there are cases where the server 102 is called another communication device. Conversely, from the standpoint of the server 102, there are cases where the communication device 101 is called another communication device. Furthermore, an HTTP/2 connection can be called simply a "connection", and an HTTP/2 stream can be called simply a "stream". A PUSH_PROMISE frame is used to make a reservation request, and may therefore be called simply a "reservation request"; a stream through which a PUSH_PROMISE is received and a stream through which a server push is received may be called first and second streams, respectively. Furthermore, maintaining a connection through the sending and receiving of a PING frame may be called "connection maintenance". The reserved stream table can be called information indicating that processing for maintaining a connection has already been initiated. In this case, S302 corresponds to a process for determining whether or not processing for maintaining a connection has already been initiated.

Second Embodiment

Drawings, and constituent elements illustrated in the drawings, that are the same as those described above will not be described in the second embodiment. Another embodiment of the present invention will be described hereinafter with reference to the drawings.

Figure 8:
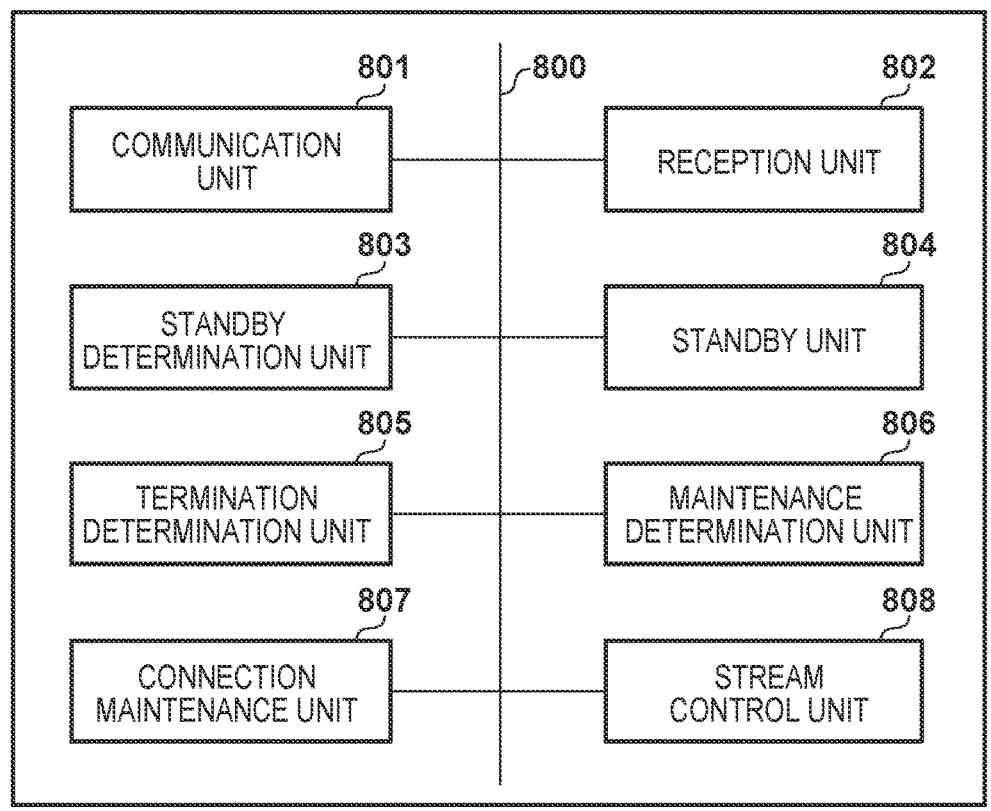
FIG. 8 is a diagram illustrating a system configuration of a server 102 according to a second embodiment.

FIG. 8 is a diagram illustrating a module configuration of the server 102. Reference numeral 800 indicates a bus to which the modules are connected. Reference numeral 801 indicates a communication unit that carries out TCP/IP processing and TLS (Transport Layer Security) processing. Reference numeral 802 indicates a reception unit that receives HTTP/2 communication from the communication device 101. Reference numeral 803 indicates a standby determination unit that determines whether or not to stand by using a standby unit 804. Reference numeral 804 indicates the standby unit, which stands by in order to control a time period serving as a reference for a determination made by a maintenance determination unit 806. Reference numeral 805 indicates a termination determination unit that determines whether to terminate processing carried out by the maintenance determination unit 806 and a connection maintenance unit 807. Reference numeral 806 indicates the maintenance determination unit, which determines whether or not to maintain a connection through the connection maintenance unit 807. Reference numeral 807 indicates the connection maintenance unit, which communicates with the communication device 101 in order to maintain a connection. Reference numeral 808 indicates a stream control unit through which frames are sent to the server 102 over a stream. Although the stream control unit 808 processes four streams here, the number of processed streams is not limited to four, and may be any number up to the maximum number of streams as defined by the protocol.

FIG. 3 is a flowchart illustrating, in communication using HTTP/2, processing through which the server 102 makes a communication determination and maintains a connection with the communication device 101. Although FIG. 3 is also used in the first embodiment, the communication device 101, which serves as a client, is the primary executor of the processing in the first embodiment, whereas the server 102 is the primary executor of the processing in the present embodiment. Aside from the difference in the primary executor and the devices involved as a result, a connection maintenance process is executed through the sequence illustrated in FIG. 3 in the present embodiment as well. Although the following simplifies the descriptions of FIG. 3 slightly as compared to the first embodiment, the processing is essentially the same as that described in the first embodiment, with the exception of the server and client being switched. Unlike in the first embodiment, the timing for initiating this flow, or in other words, the trigger, is the communication device 101 sending, to the server 102, a reservation request for a server push using a PUSH_PROMISE frame (or a stream using the same). The reservation request may, for example, be included as information indicating a reservation request in an index file request sent from the communication device 101 to the server 102 (M902 in FIG. 9, for example). Alternatively, the trigger of the sequence illustrated in FIG. 3 may be the server 102 sending a PUSH PROMISE frame to the communication device 101.

The standby determination unit 803 determines whether or not to stand by using the standby unit 804 (S302). The standby determination unit 803 ends the process in the case where there is already a stream that has been reserved for a server push. The process moves to S303 in the case where there is a stream that has already been reserved for a server push. The standby determination unit 803 may make this determination on the basis of whether or not there is a reserved stream registered in a reserved stream table that stores a list of streams reserved for a server push, or may make this determination on the basis of whether or not there is a stream whose state is reserved (local) or half closed (remote).

The standby unit 804 stands by for a standby time (S303). Here, the "standby time" may be a standby time held by the server 102 or may be a standby time held by the communication device 101. For example, an amount of time a connection can be maintained between the communication device 101 and the server 102 may be measured and a lower value than the measured value may be used. Alternatively, the standby time may be a random time calculated using part of the stated times.

To determine whether to end the processing performed by the maintenance determination unit 806 and the connection maintenance unit 807, the termination determination unit 805 confirms whether or not a stream reserved for a server push remains (S304). The process moves to S305 in the case where a stream that has been reserved for a server push remains. The process ends in the case where a stream that has been reserved for a server push does not remain.

The maintenance determination unit 806 determines whether or not the connection maintenance unit 807 will maintain a connection; the process moves to S303 in the case where there has been communication on the connection while the standby unit 804 was standing by, and moves to S306 in the case where there was no communication on the connection while the standby unit 804 was standing by.

The connection maintenance unit 807 sends and receives a PING frame, and the process moves to S303. Here, the PING frame may be a frame type used in communication, such as a HEADERS frame. The PING frame may also be a DATA frame using a server push stream.

Figure 9:
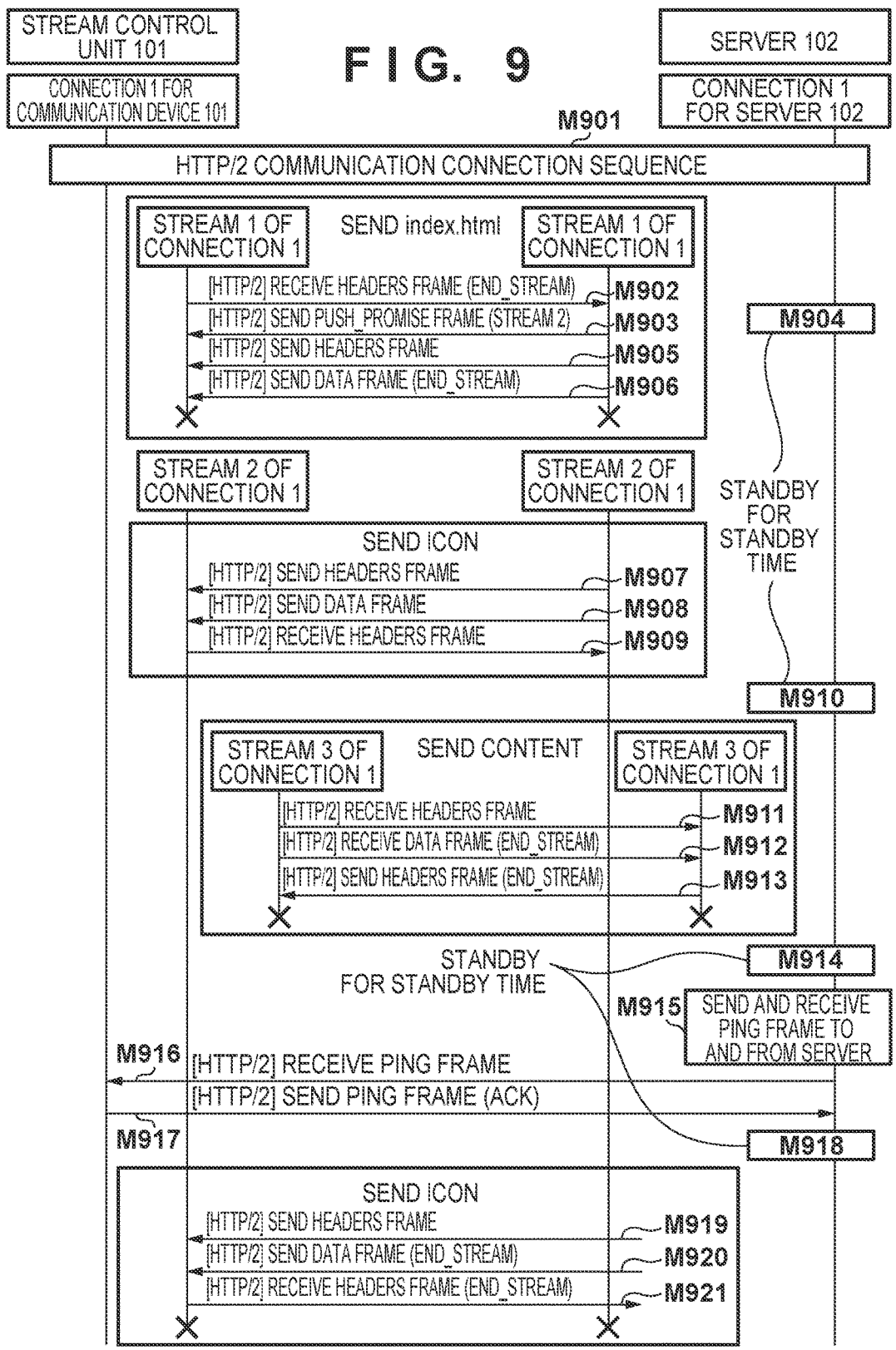
FIG. 9 is a sequence chart illustrating, in communication using HTTP/2, processing carried out when the server 102 makes a communication determination and maintains a connection with the communication device 101.

FIG. 9 is a sequence chart illustrating, in communication using HTTP/2, processing through which the server 102 makes a communication determination and maintains a connection with the communication device 101.

In M901, the communication unit 801 initiates HTTP/2 communication with the communication device 101 and opens a connection 1.

In M902, the reception unit 802 receives, from the communication device 101, a HEADERS frame specifying an END_STREAM flag in its payload. In M903, the stream control unit 808 sends a PUSH_PROMISE frame. Note that M903 may be carried out after M904. In M904, the standby determination unit 803 determines that there are no other streams reserved for a server push (No in S302), and the standby unit 804 stands by for the standby time (S303). In M905, the stream control unit 808 sends, to the communication device 101, a HEADERS frame response in response to M902. In M906, the reception unit 802 receives, from the communication device 101, a DATA frame specifying an END_STREAM flag in its payload. Although M905 and M906 indicate sending a HEADERS frame and sending a DATA frame (END_STREAM), the sequence may instead be for sending a HEADERS frame, sending a DATA frame, and sending a DATA frame (END_STREAM), for sending a HEADERS frame (END_STREAM), or the like.

In M907, the stream control unit 808 sends a HEADERS frame to the communication device 101. In M908, the stream control unit 808 sends a DATA frame to the communication device 101. In M909, the reception unit 802 receives, from the communication device 101, a HEADERS frame response as a response to M907 and M908.

In M910, the termination determination unit 805 determines, after standing by in M904, that there is a stream currently reserved for a server push (Yes in S304); the maintenance determination unit 806 determines that there has been communication during the standby (Yes in S305); and the standby unit 804 stands by for the standby time (S303).

In M911, the reception unit 802 receives a HEADERS frame from the communication device 101. In M912, the reception unit 802 receives, from the communication device 101, a DATA frame specifying an END_STREAM flag in its payload. In M913, the stream control unit 808 sends, to the communication device 101, a HEADERS frame response specifying an END_STREAM flag in its payload, in response to M911 and M912. Although M910 to M912 indicate receiving a HEADERS frame, receiving a DATA frame, and sending a HEADERS frame, the sequence may instead be for sending and receiving a PING frame, a SETTINGS frame, or the like.

In M914, the termination determination unit 805 determines, after standing by in M910, that there is a stream currently reserved for a server push (Yes in S304); the maintenance determination unit 806 determines that there has been communication during the standby (Yes in S305); and the standby unit 804 stands by for the standby time (S303).

In M915, the termination determination unit 805 determines, after standing by in M914, that there is a stream reserved for a server push (Yes in S304); the maintenance determination unit 806 determines that there has been no communication over the connection during the standby (No in S305); and the connection maintenance unit 807 sends and receives a PING frame to and from the communication device 101 (S306). Here, the PING frame may be a frame type used in communication, such as a HEADERS frame. M916 and M917, which will be described later, correspond to the sequence for sending and receiving the PING frame in M915.

In M916, the stream control unit 808 sends the PING frame to the communication device 101. In M917, the reception unit 802 receives, from the communication device 101, a PING frame specifying an ACK flag in its payload in response to M916.

In M918, the standby unit 804 stands by for the standby time (S303).

In M919, the stream control unit 808 sends a HEADERS frame to the communication device 101. In M920, the stream control unit 808 sends, to the communication device 101, a DATA frame specifying an END_STREAM flag in its payload. In M921, the reception unit 802 receives, from the communication device 101, a HEADERS frame response specifying an END_STREAM flag in its payload, in response to M919 and M920. It is determined that there is no stream currently reserved for a server push after standing by in M913 (No in S304), and the process then ends.

As described thus far, according to the present embodiment, when making a server push, the server 102 monitors a time period of no communication on the connection used for the server push, and when there is no communication for more than a predetermined amount of time, sends some sort of frame, such as a PING. On the other hand, a frame such as a PING frame is not sent or received when there is communication within the predetermined amount of time. This makes it possible to omit the sending and receiving of frames not needed to maintain a connection.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e. g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e. g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-105820, filed May 25, 2015, which is hereby incorporated by reference herein in its entirety.

What is claimed is:

1. A communication device comprising:
at least one hardware processor; and
a memory which stores instructions executable by the at least one hardware processor to cause the communication device to perform at least:
    establishing, with another communication device, one or more streams as one or more logical communication paths based on a connection established with the another communication device;
    receiving a notification for reserving a new stream, which has not been established and which is based on the connection established with the another communication device, after establishing the one or more streams;
    determining whether a no-communication time period, which is a time period in which no communication through any of streams based on the connection including the one or more streams established based on the connection and the new stream reserved based on the connection is carried out with the another communication device, has reached a predetermined amount of time after the notification for reserving the new stream based on the connection established with the another communication device has been received from the another communication device; and
    executing a connection maintenance processing in a case where the no-communication time period, in which no communication through any of streams based on the connection including the one or more streams established based on the connection and the new stream reserved based on the connection is carried out, is determined to have reached the predetermined amount of time after the notification for reserving the new stream based on the connection has been received from the another communication device, wherein the connection maintenance processing comprises a process for sending a message for maintaining the connection to the another communication device.

2. The communication device according to claim 1, wherein the instructions further cause the communication device to perform:
    determining whether or not a process for maintaining the connection has been initiated in response to the notification for reserving the new stream received from the another communication device; and
    wherein a count for the no-communication time period is started when it is determined that the process for maintaining the connection has not been initiated.

3. The communication device according to claim 2, wherein whether or not the process for maintaining the connection has been initiated is determined by referring to reference information indicating that the process for maintaining the connection has been initiated.

4. The communication device according to claim 3, wherein the communication device and the another communication device are HTTP/2-compliant communication devices; and
the reference information includes an ID of a reserved stream, used for a server push, reserved based on the connection.

5. The communication device according to claim 4, wherein the connection maintenance processing is ended in a case where the reserved stream based on the connection no longer exists.

6. The communication device according to claim 4, wherein the instructions further cause the communication device to perform:
    determining, based on information indicating that a server push will be performed, that the notification for reserving the new stream based on the connection has been received, wherein the information is included in data received from the another communication device in response to a request to the another communication device.

7. The communication device according to claim 3, wherein the communication device and the another communication device are HTTP/2-compliant communication devices; and
the reference information indicates that at least one reserved stream used for server push is reserved based on the connection.

8. The communication device according to claim 3, wherein the communication device and the another communication device are HTTP/2-compliant communication devices; and
the reference information indicates that the state of a stream associated with the connection is a reserved state.

9. The communication device according to claim 1, wherein the communication device receives an HTTP/2 PUSH_PROMISE frame from the another communication device as the notification for reserving the new stream.

10. The communication device according to claim 1, wherein the communication device is an HTTP/2 client and the another communication device is an HTTP/2 server.

11. The communication device according to claim 1, wherein the communication device receives an HTTP/2 PUSH_PROMISE frame from the another communication device as the notification for reserving the new stream; and it is determined that the notification of the reservation of the new stream in the connection has been made in a case where a request to send the PUSH_PROMISE frame has been received.

12. The communication device according to claim 1, wherein the another communication device is an HTTP/2 client and the communication device is an HTTP/2 server.

13. A communication method executed by a communication device, the method comprising:
    establishing, with another communication device, one or more streams as one or more logical communication paths based on a connection established with the another communication device;
    receiving a notification for reserving a new stream, which has not been established and which is based on the connection established with the another communication device, after establishing the one or more streams;
    determining whether a no-communication time period, which is a time period in which no communication through any of the streams based on the connection including the one or more streams established based on the connection and the new stream reserved based on the connection is carried out with the another communication device, has reached a predetermined amount of time after a notification for reserving a new stream based on the connection established with the another communication device has been received from the another communication device; and
    executing a connection maintenance processing in a case where the no-communication time period, in which no communication through any of streams based on the connection including the one or more streams established based on the connection and the new stream reserved based on the connection is carried out, is determined to have reached the predetermined amount of time after the notification for reserving the new stream based on the connection has been received from the another communication device, wherein the connection maintenance processing comprises a process for sending a message for maintaining the connection to the another communication device.

14. A communication system comprising a communication device and another communication device,
    wherein the communication device comprises:
    at least one hardware processor; and
    a memory which stores instructions executable by the at least one hardware processor to cause the communication device to perform at least:
        establishing, with the another communication device, one or more streams as one or more logical communication paths based on a connection established with the another communication device;
        receiving a notification for reserving a new stream, which has not been established and which is based on the connection established with the another communication device, after establishing the one or more streams;
        determining whether a no-communication time period, which is a time period in which no communication through any of streams based on the connection including the one or more streams established based on the connection and the new stream reserved based on the connection is carried out with the another communication device, has reached a predetermined amount of time after a notification for reserving a new stream based on the connection established with the another communication device has been received from the another communication device; and
        executing a connection maintenance processing in a case where the no-communication time period, in which no communication through any of streams based on the connection including the one or more streams established based on the connection and the new stream reserved based on the connection is carried out, is determined to have reached the predetermined amount of time after the notification for reserving the new stream based on the connection has been received from the another communication device, wherein the connection maintenance processing comprises a process for sending a message for maintaining the connection to the another communication device.

15. A non-transitory computer-readable recording medium on which is recorded a program for causing a computer to perform at least:
    establishing, with another communication device, one or more streams as one or more logical communication paths based on a connection established with the another communication device;
    receiving a notification for reserving a new stream, which has not been established and which is based on the connection established with the another communication device, after establishing the one or more streams;
    determining whether a no-communication time period, which is a time period in which no communication through any of streams based on the connection including the one or more streams established based on the connection and the new stream reserved based on the connection is carried out with the another communication device, has reached a predetermined amount of time after a notification for reserving a new stream based on the connection established with the another communication device has been received from the another communication device; and
    executing a connection maintenance processing in a case where the no-communication time period, in which no communication through any of streams based on the connection including the one or more streams established based on the connection and the new stream reserved based on the connection is carried out, is determined to have reached the predetermined amount of time after the notification for reserving the new stream based on the connection has been received from the another communication device, wherein the connection maintenance processing comprises a process for sending a message for maintaining the connection to the another communication device.

* * * * *